June 23, 1970  H. S. BEST ET AL  3,517,157

AXIAL COMPONENT LEAD ATTACH MACHINE

Filed Aug. 29, 1967  11 Sheets-Sheet 1

INVENTORS
HOWARD S. BEST
GORDON R. TOMPKINS

BY

ATTORNEYS

June 23, 1970  H. S. BEST ET AL  3,517,157
AXIAL COMPONENT LEAD ATTACH MACHINE
Filed Aug. 29, 1967  11 Sheets-Sheet 2
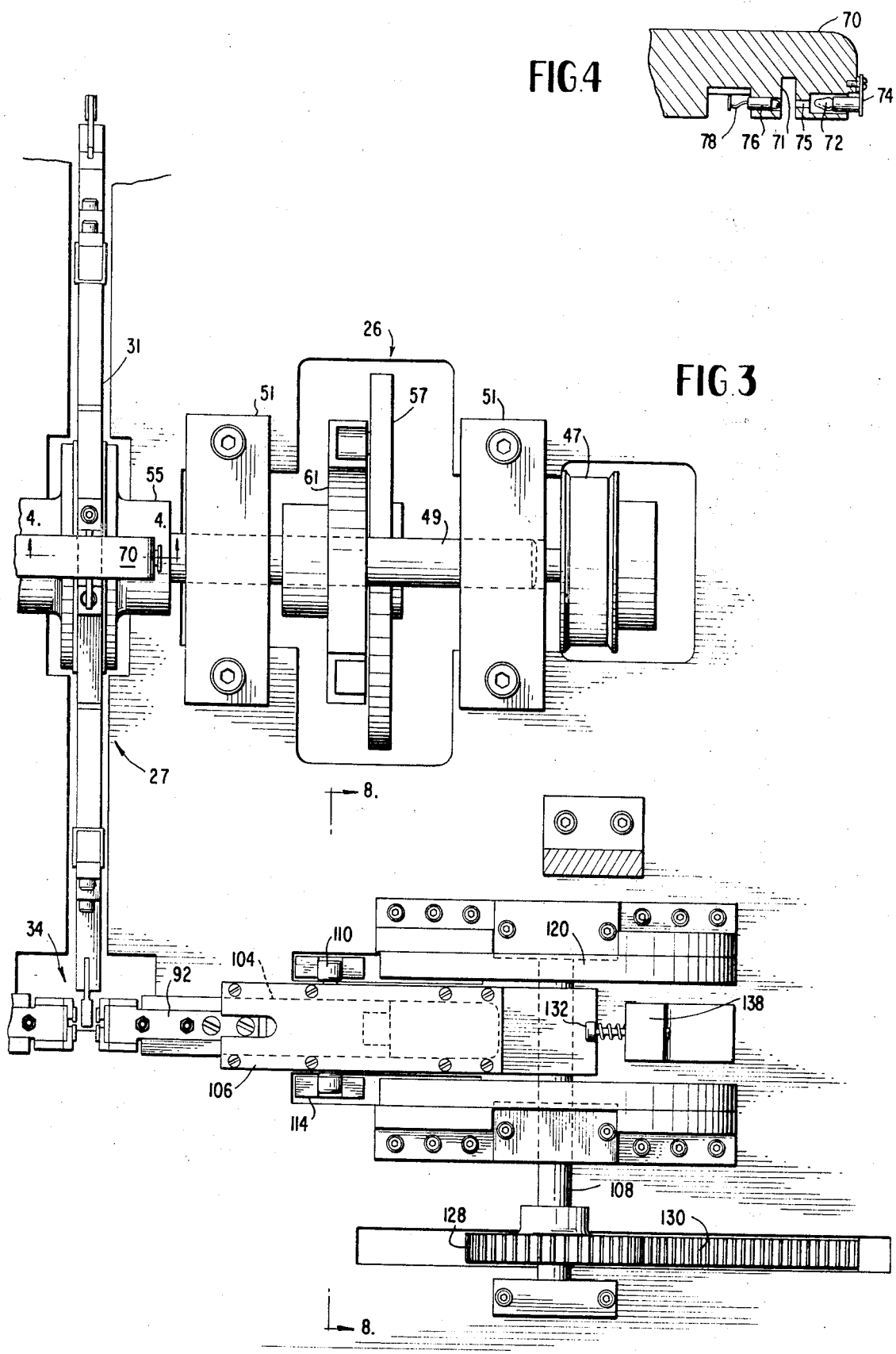

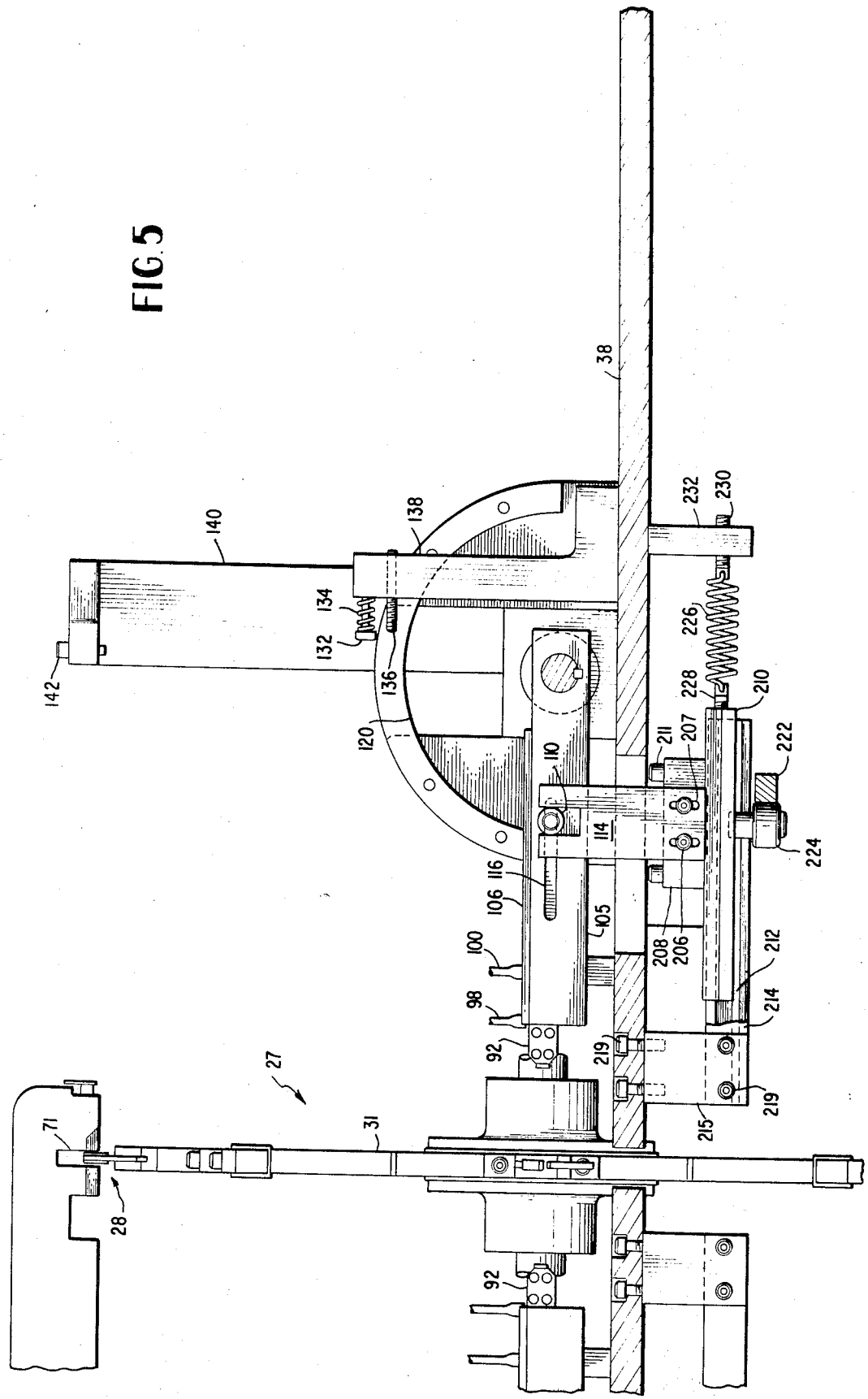

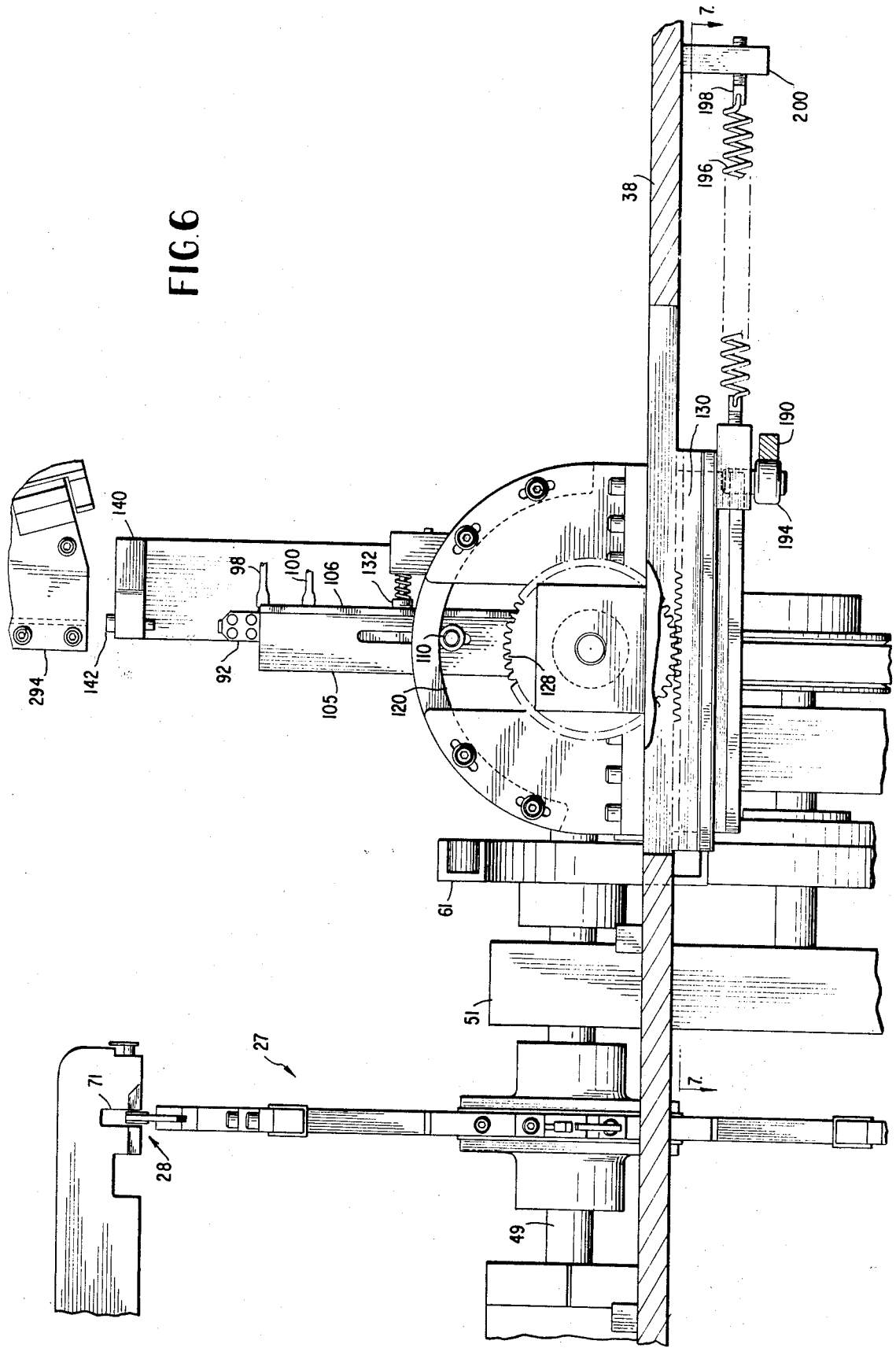

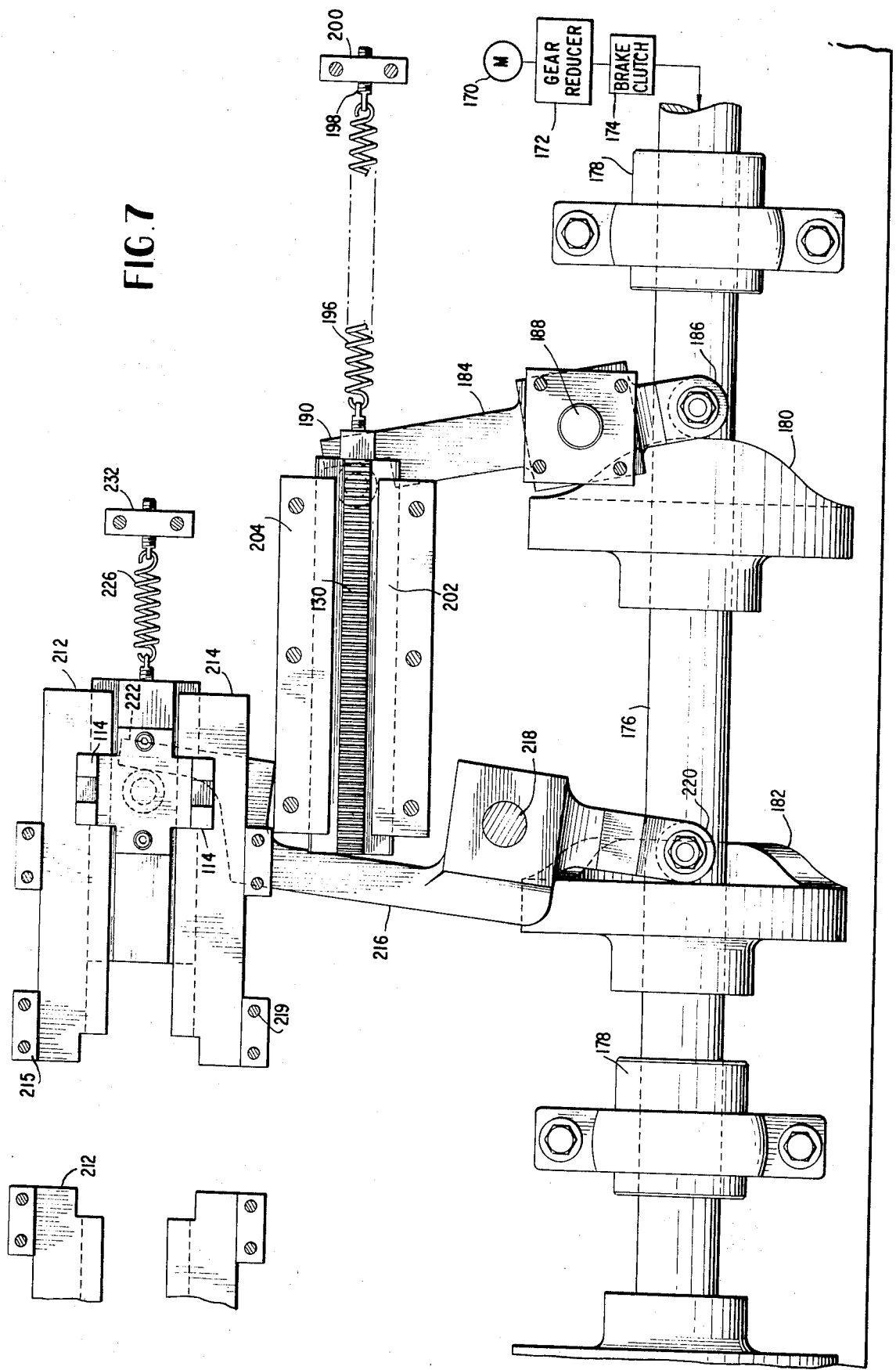

June 23, 1970  H. S. BEST ET AL  3,517,157
AXIAL COMPONENT LEAD ATTACH MACHINE
Filed Aug. 29, 1967  11 Sheets-Sheet 6
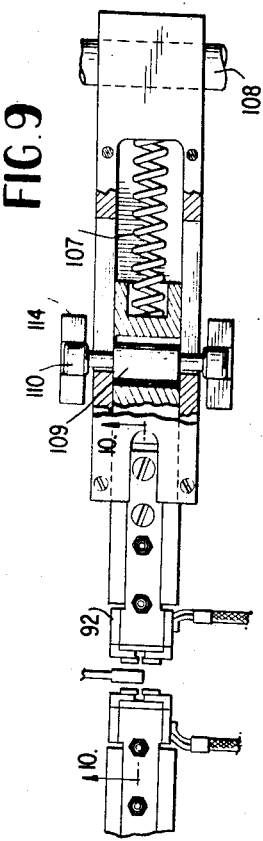
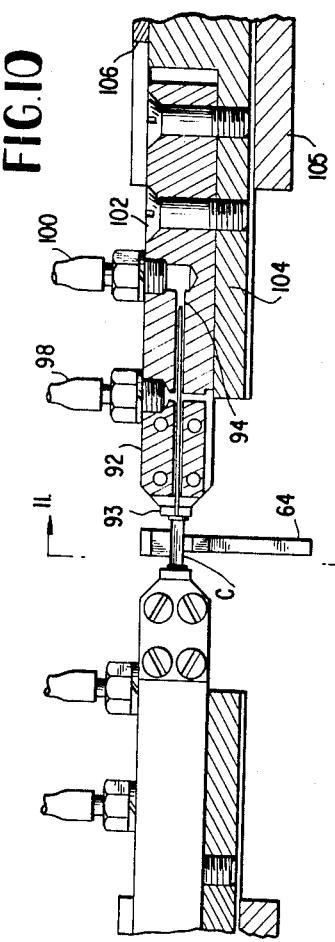
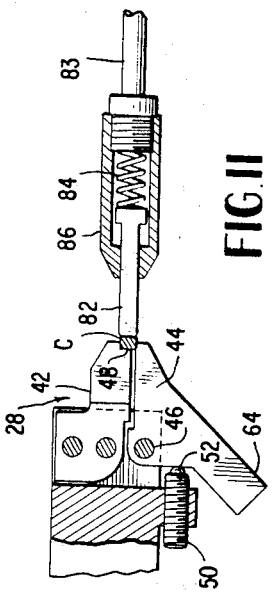
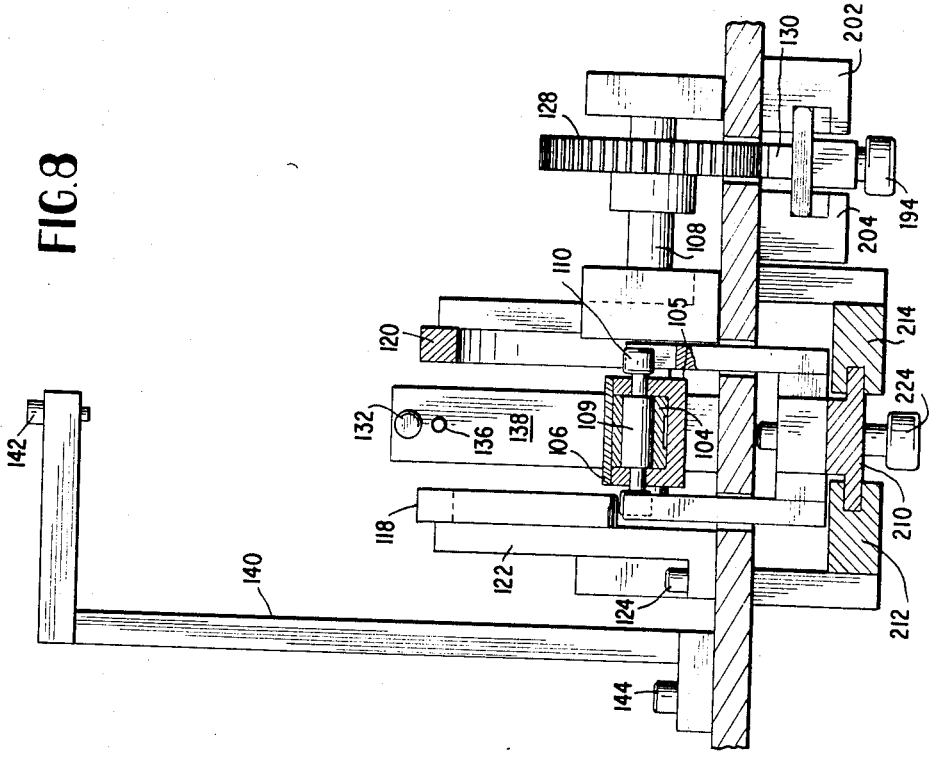

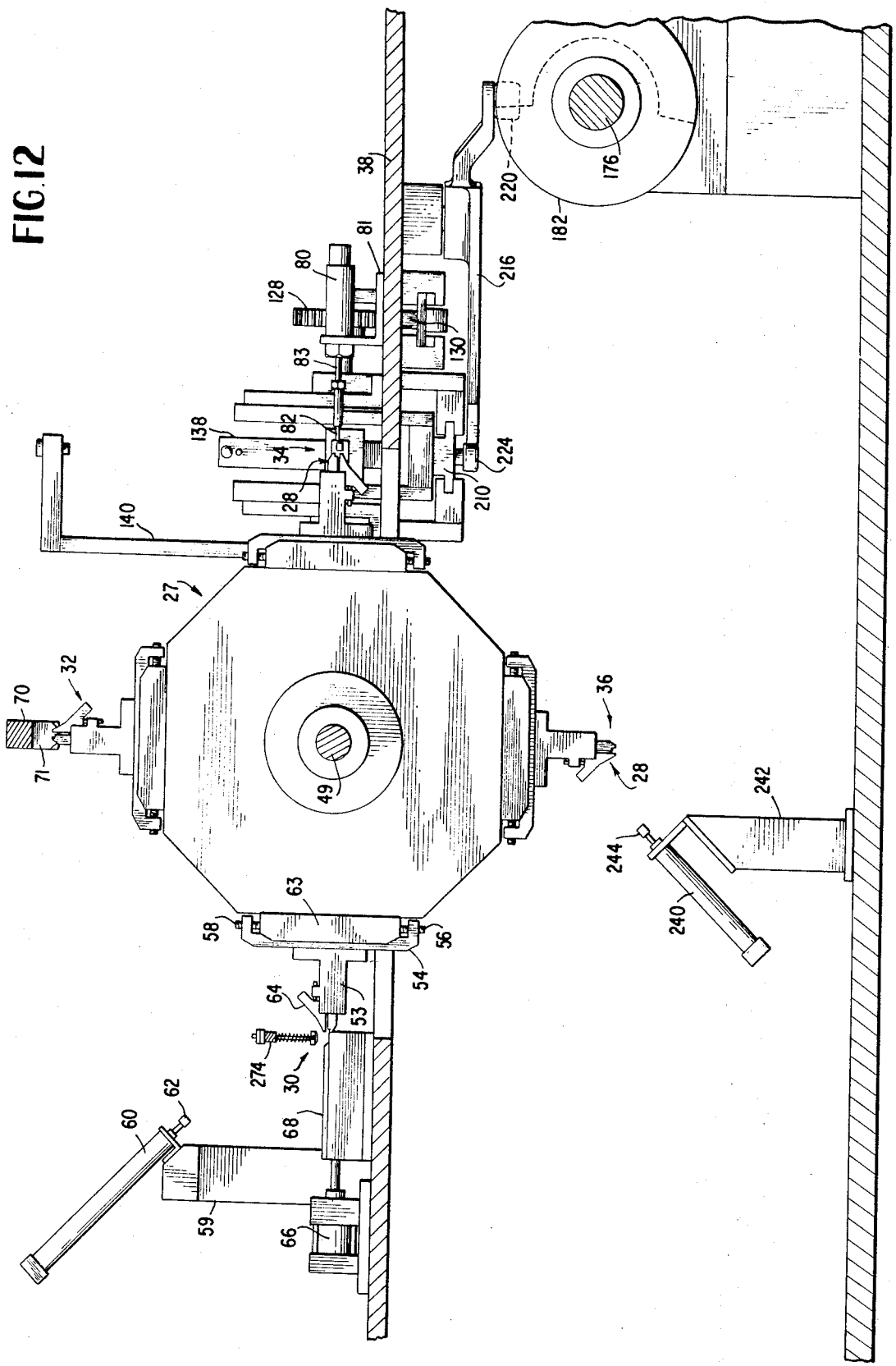

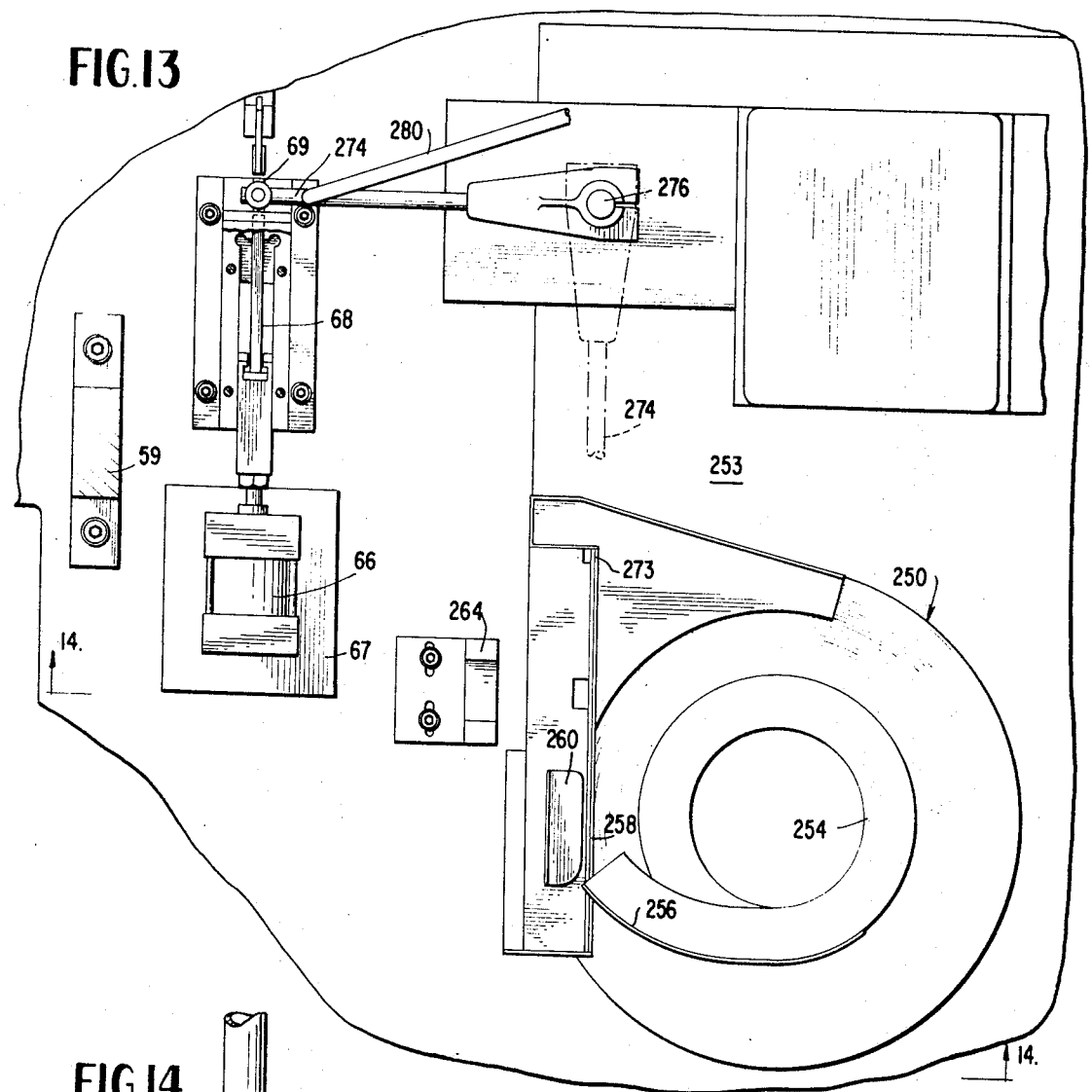
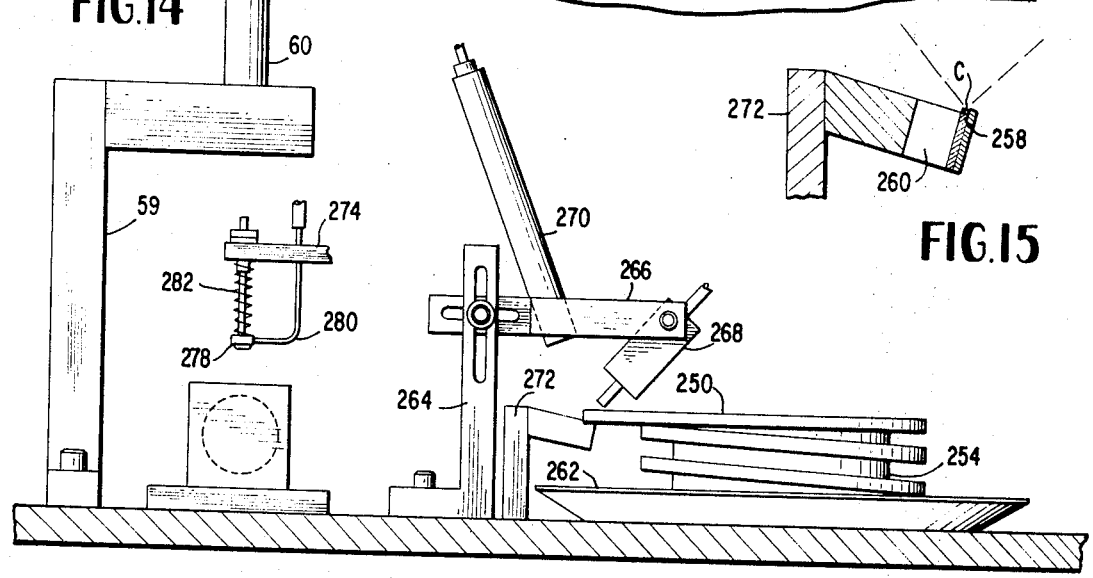

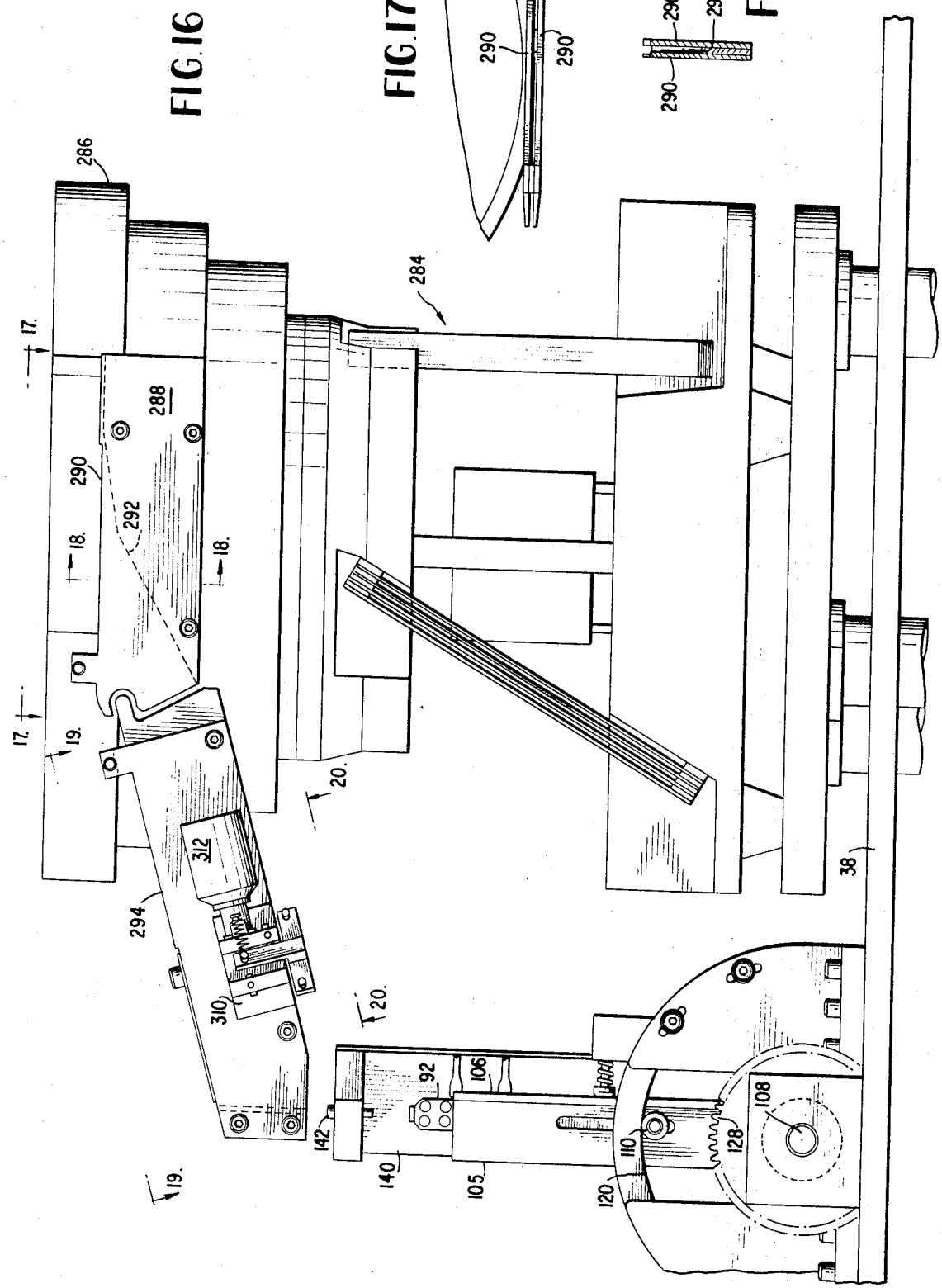

United States Patent Office 3,517,157
Patented June 23, 1970

3,517,157
AXIAL COMPONENT LEAD ATTACH MACHINE
Howard S. Best, Horseheads, N.Y., and Gordon R. Tompkins, Raleigh, N.C., assignors to Corning Glass Works, Corning, N.Y., a corporation of New York
Filed Aug. 29, 1967, Ser. No. 664,148
Int. Cl. B23k 1/02, 1/04
U.S. Cl. 219—85                                    12 Claims

ABSTRACT OF THE DISCLOSURE

The machine automatically positions successive electronic components and axial leads and resistance solders leads to the ends of each component. The components are loaded into clamps on the periphery of a wheel which steps to carry the components through a checking station to a soldering station. Axial leads are carried by oscillating arms from a vertical loading position to the soldering station. Electric current is passed through the tips of the arms to accomplish the resistance soldering. An unloading station follows the soldering station in the path of the wheel.

BACKGROUND OF INVENTION

Field of the invention

This invention relates to a machine for automatically and rapidly applying axial leads to opposite ends of electronic components by means of resistance soldering after the components and leads are positively aligned.

Description of the prior art

The prior known arrangements for attaching tab leads to electronic components usually included mechanically forming each lead around each end of the component. This arrangement caused misalignment of leads and high losses at the time of attachment. Because of lead configuration in the prior art, the leads were loaded manually. At best, the prior lead attach operation was semiautomatic.

SUMMARY

This invention provides a machine for attaching axial leads to electronic components which provides a great improvement in selection, an increase in output many times over the prior known machines, and much better product reliability.

The machine automatically loads electronic components (capacitor chips in the illustrated embodiment) and leads, positively positions the leads and components to eliminate misalignment, resistance solders the leads rapidly, and automatically unloads the finished parts.

In general, the machine includes a support table mounting a component carrying wheel on a horizontal axis and also mounting oscillatable lead carrying arms pivotable about horizontal axes positioned at right angles to the wheel axis. The wheel is stepped by a Geneva drive so that component holding clamps on the periphery of the wheel step the components through four stations; namely, a loading station, a checking station, a soldering station, and an unloading station. Components are loaded into the clamps at the loading station and at the checking station are checked to see if the loading took place. The leads are dropped into jaws of the arms in a vertical position and the arms oscillate down to place the leads in alignment with the axis of the component. The arms move axially toward each other to place the leads against the end of the components and the leads are resistance soldered to the components. During the soldering operation the leads and the components are positively aligned by the machine. At the unloading station, the clamps are opened and the finished component drops from the wheel by gravity. All of the operations are synchronized and interlocked as well as automatically controlled.

BRIEF DESCRIPTION OF THE DRAWINGS

FIG. 3 is a top plan view of the component carrying wheel and drive therefor, and of one lead carrying arm.

FIG. 4 is a detailed partial sectional view taken along lnie 4—4 of FIG. 3.

FIG. 5 is a front sectional elevation view taken along line 5—5 of FIG. 3.

FIG. 6 is a front sectional elevational view taken along line 6—6 of FIG. 3.

FIG. 7 is a top plan view with the main cam shaft and drives therefrom for the lead carrying arms looking along line 7—7 of FIG. 6.

FIG. 8 is a side sectional elevation view taken along line 8—8 of FIG. 3.

FIG. 9 is a detail top plan view taken at the soldering station and showing a portion of the lead carrying arm in section for the sake of clarity.

FIG. 10 is an enlarged sectional view taken along line 10—10 of FIG. 9.

FIG. 11 is a sectional view taken along line 11—11 of FIG. 10.

FIG. 12 is a side elevation sectional view taken along line 12—12 of FIG. 1.

FIG. 13 is a top plan view of the component loading assembly.

FIG. 14 is a side elevational view of a component loading assembly taken along line 14—14 of FIG. 13.

FIG. 15 is a detailed sectional view of a component inspection device at the component loading assembly.

FIG. 16 is a front elevational view of the loading assembly for loading leads into each of the lead carrying arms.

FIG. 17 is a top plan view looking in the direction of line 17—17 of FIG. 16.

FIG. 18 is a sectional view taken along line 18—18 of FIG. 16.

DESCRIPTION OF THE PREFERRED EMBODIMENT

General arrangement

Figures 1, 2:
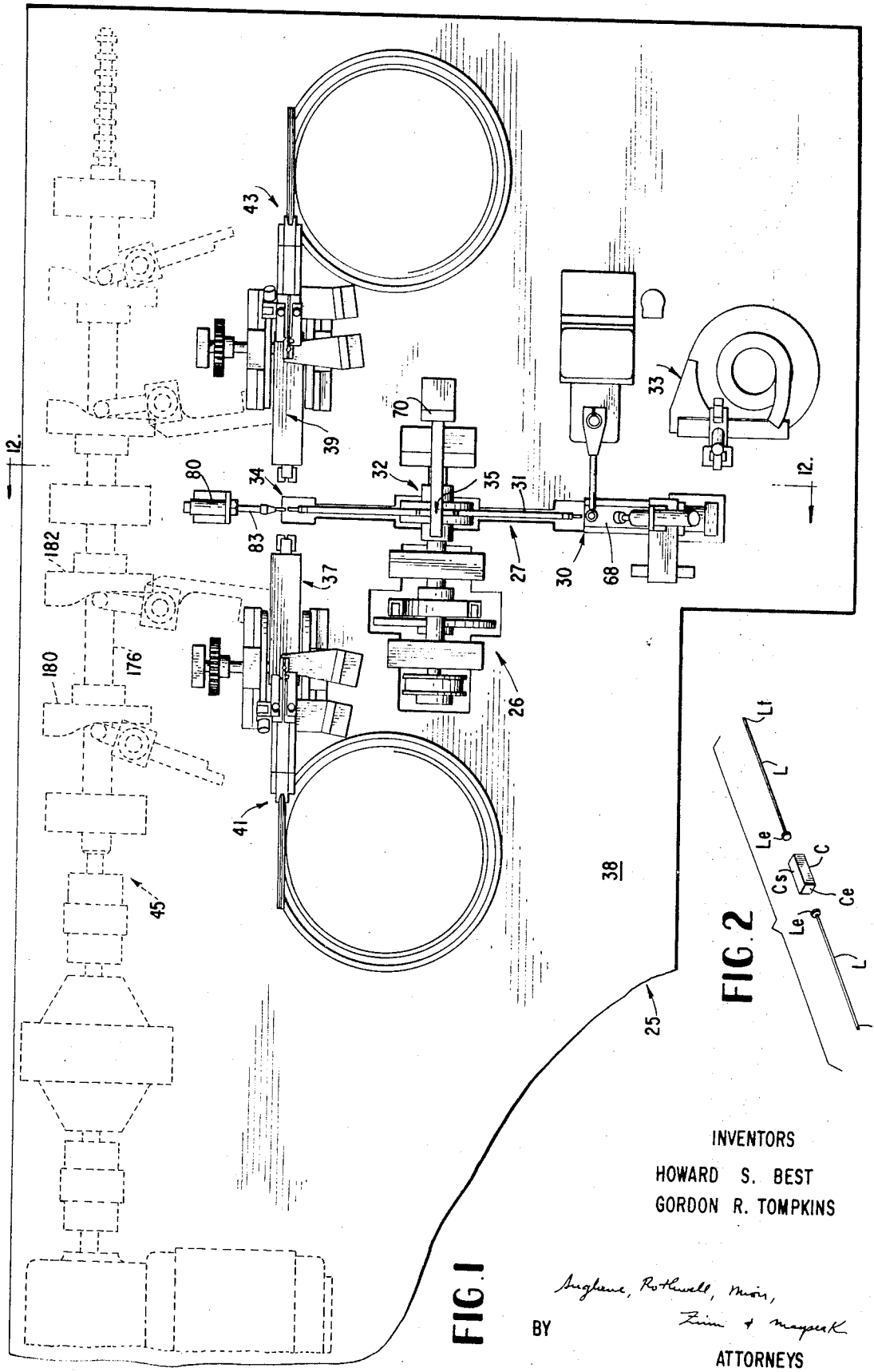
FIG. 1 is a top plan view of the axial component lead attach machine of this invention.
FIG. 2 is a perspective view of an electronic component and axial leads for attaching thereto.

As shown in FIG. 1, a support table assembly 25 mounts a wheel assembly 27 on a horizontal axis to be driven in a step-by-step manner by a Geneva assembly 26. As shown in FIG. 12, a wheel 31 has four flat sides 29 each of which carries a clamp assembly 28. The wheel assembly 27 stepped by the Geneva drive carries each clamp assembly through four stations also shown in FIG. 12. These stations are a load station 30, detect station 32, lead attach or soldering station 34 and discharge station 36.

Referring to FIG. 1, a component load assembly 33 is provided for loading the components into the clamps at the load station 30. A detect assembly 35 is positioned at the detect station 32. A pair of lead carrying arm assemblies 37 and 39 are positioned on opposite sides of the lead attached station 34 and are mounted for oscillation from lead loader assemblies 41 and 43 where the arms receive the leads to the lead attach or soldering station 34 where the leads are attached by soldering. The drive of the lead arms 37 and 39 in oscillating fashion about horizontal axis and in an axial manner for positioning is accomplished by a main cam drive assembly 45.

The component and the leads are shown in an exploded perspective view in FIG. 2. The component C may be a capacitor chip in the form of a small bar 0.180 inch long and having a rectangular section 0.040 and 0.060 inch. The capacitor chip has opposite rectangular ends Ce which are silver coated and two of the four sides of the chip bar are glossy while the other two sides are dull, and this contrast is used for positioning. The glossy side is illustrated as Cs. Leads L are attached at the chip end Ce at their upset lead ends Le which may be flat or curved, and are coated with solder for the resistance soldering operation.

SUPPORT TABLE ASSEMBLY, WHEEL ASSEMBLY AND CLAMP ASSEMBLIES

The support table assembly 25 includes a surface table 38 on which the components shown in full lines of FIG. 1 are visible and under table 40 on which certain other controls are mounted as shown for example in FIG. 12.

The wheel assembly 27 includes the wheel 31 having four flat sides 29 and each flat side mounts a clamp assembly 28, FIG. 12. Each clamp assembly is identical and only one will be described. The clamp assembly is shown in detail in FIG. 11 and includes a stationary jaw 42 and a pivotal jaw 44 mounted for swinging about pivot 46. An aligning notch 48 is provided in the stationary jaw for aligning the body of the capacitor component C. The pivotal jaw 44 is biased to clamping position by an adjustable screw 50 carrying a spring therein which, through spring biased head 52 acts on the back side of pivotal jaw 44. The jaw 44 has an actuating arm extension 64.

Referring to FIG. 12, it can be seen that the clamp assembly further includes a clamp column 53 mounted on a clamp base 54. The clamp base is adjustable relative to the flat side 29 of wheel 31 through adjusting screws 56 and 58 cooperating through the opposite sides of a mounting member 63.

The Geneva drive assembly 26 for the wheel 31 is shown in FIG. 3 and includes a drive pulley 47 mounted on the end of a shaft 49 which shaft is journalled in suitable bearings 51. The wheel 31 is mounted by hub 55 to a portion of the shaft 49 and the Geneva drive assembly 26 includes a conventional Geneva drive member 57 cooperating with the Geneva driven member 61. With the drive member continuously rotating the driven member will move in a step-by-step manner.

LOADING STATION

Referring to FIGS. 1, 12 and 13, the loading station 30 includes a clamp opening cylinder 60 mounted on column 59 and having a piston rod 62 extending in a direction to cotact actuating arm 64 and open the clamp positioned at the loading station so that a loading cylinder 66 mounted on base 67 can actuate a loading slide 68 to push a component which has been deposited on slide base 69 into the open clamp jaws. At this time the clamp opening cylinder 60 retracts and the spring biased head 52 causes jaw 44 to close on the component and clamp it firmly.

COMPONENT DETECT STATION

The component detect station 32 includes an overhead column 70 mounted from table 38 having a slot 71 therein for passage of the wheel 31 and the component, see FIG. 4. The overhead portion carries a bulb 72 mounted on bracket 74 which shines light through hole 75 and may be detected by detector 76 connected by conductor 78 to the circuitry shown in FIG. 23.

LEAD ATTACH STATION

At the lead attach or soldering station 34 there is a positioning and clamping cylinder 80 mounted in bracket 81 from table 38 and including an extendable piston rod 82 which carries a positioning tip 82 biased outwardly by spring 84 within tubular member 86, see FIG. 11. Actuation of cylinder 80 extends tip 82 to contact component C and position the component firmly in aligning notch 48 and hold it during the soldering operation.

LEAD CARRYING ARM ASSEMBLY

Each of the lead carrying arm assemblies 37 and 39 is identical and only one will be described in detail. Jaw 92 has an axial hole 94 therein for holding the leads L with the upset end Le at the outside of the hole, see FIG. 10. Electrical conductors 96 are connected to resistance heating tips 93 of the jaw 92 via connecting screws 95. A vacuum line 98 is connected to a transverse hole 99 to detect whether a lead is carried in the arm and a vacuum line 100 is connected to hole 94 to hold the lead in the jaw. The jaw 92 is attached to a slide 104 by means of screws 102. The slide 104 together with jaw 94 is axially movable within a swingable tube 105. FIG. 3, 9, 10 and 8 best show the construction. The swing tube 105 has a top cover 106 and a spring 107 biases the slide 104 axially outward, see FIG. 9. The swing tube 105 is rigidly mounted on a rotatable shaft 108 for swinging the entire swing tube and jaw about the axis of shaft 108. For axially moving the jaw 92 there is provided a roller shaft 109, see FIG. 8, having rollers 110 on each end thereof. These rollers cooperate with yoke 114, see FIGS. 3 and 5, and the roller shaft and slide 104 may move axially within the swing tube by virtue of slots 116, FIG. 5.

A pair of spaced apart upright semicircular guides 118, see FIGS. 5 and 8, are provided for guiding the rollers 110 and holding the jaw 94 in the retracted position while it is being oscillated to a vertically upright position and loaded with a lead. The guides 118 are mounted on support columns 122 held to the table by suitable screws 124.

Shaft 108 for rotating the lead arm assembly 37 is mounted in suitable bearings 126 and is rotated by pinion 128 cooperating with rack 130, see FIG. 3.

The vertical position of lead arm assembly 37, see FIGS. 5 and 6, is determined by a bumper stop arrangement including bumper 132 biased outwardly by spring 134 and adjustable stop 136 mounted on upright posts 138.

For loading a lead L into the jaw 92 in its vertical upright position there is provided a loading funnel 142 mounted on column 140 so that the funnel passageway extends vertically from directly above the vertical position of jaw 92, see FIG. 6.

LEAD ARM DRIVE

The main drive assembly 45 for the lead arms is shown best in FIGS. 1 and 7. FIG. 1 shows the overall drive assembly in dotted lines underneath the table 38 while FIG. 7 shows the basic components of the drive to lead arm assembly 37. Since the drives are identical from both lead arm assemblies, only one will be described.

The drive includes a motor 170 which drives cam shaft 176 through gear reducer 172 and brake clutch arrangement 174. The main cam shaft 176 is mounted on suitable bearings 178 and 180 and rigidly carries a pair of cams 180 and 182. Cam 180 is the swing cam causing swinging movement of arm assembly 37 while cam 182 is the cam causing reciprocation of the jaw 94.

To accomplish the swinging movement of arm assembly 37, swing cam 180 causes pivotal movement of cam follower lever 182 which has a cam follower roller 186 on one end thereof in contact with cam 180 and is pivoted about a vertical pivot 188, see FIG. 7. Tip 190 of cam follower level 188 cooperates with a roller 194 on the bottom of rack 130, see FIGS. 7 and 6. Rack 130 is biased to the right as viewed in these figures by a spring 196 secured to one end of the rack and to an adjustable screw stop 198 in mounting bracket 200. Rack 130 is guided for reciprocating movement by track guides 202 and 204. As described, rack 130 is engaged with pinion 128 on shaft 108 so when cam 180 causes pivotal movement of cam follower lever 184 reciprocating rack 130 the pinion 128 will cause the swing tube 105 and jaw 92 to oscillate about the axis of shaft 108 from a horizontal position adjacent the lead attach station 34 (FIG. 5) to a vertical position adjacent the lead feed funnel 142 (FIG. 6).

Yoke 114 is attached to a block 208 by screws 206 extending through slots 207 and block 208 is in turn attached to slide 210 by screws 211, FIG. 5. Slide 210 is guided in tracks 212 and 214 extending along opposite sides thereof and these tracks are supported by bracket 215 secured to table 38 with screws 217 and to the guide by suitable screws 219. The slide has a roller 224 on the bottom side thereof. This roller is contacted by tip 222 of cam follower lever 216. The cam follower lever 216 is pivoted about pivot 218 and includes cam follower roller 220 contacting reciprocating cam 182, FIG. 7. A spring 226 attached to screws 228 and 230 biases the slide rearwardly. Screw 230 is mounted in a bracket 232.

DISCHARGE STATION

At the component discharge station 36 there is a component discharge cylinder 240 having a tip 242 on its piston rod and mounted on a bracket 244 from under table 40, FIG. 12. The cylinder 240 when actuated opens jaw 46 of the clamp at the discharge station allowing the component with the lead soldered thereto to fall into a suitable receptacle, conveyor or the like (not shown).

COMPONENT LOAD ASSEMBLY

The component load assembly 33 is shown in detail in FIGS. 13–15 and includes a bowl vibrator unit 250 and pick-up unit 252 mounted on base 253. These components are commercially available. They are an AMI Micro Feeding System (Affiliated Manufacturing Incorporated) of modified to reject the components and not feed components unless the desired side of the component is up. In the specific arrangement, the device is set to recycle components C unless the glazed or shiny side is up. The bowl vibrator unit includes a standard vibrating bowl 254 having a feeder rim 256 feeding onto a component track 258. The components C are inspected on the track adjacent a recycle hole 260 and if the glazed side of the components are not up they are recycled by being blown off track 258 through hole 260 into tray 262, see FIGS. 15 and 14. A column 264 mounts an adjustable beam 266 which in turn carries a photosensitive detector and reject blower unit 268 and a light source 270. As shown in FIG. 15, a bracket 272 supports the component track 258 and the light ray is arranged to reflect off the glazed side of the component $C_s$ into the photodetector-recycle blower unit. If the glazed side is not up, the photodetector detects this and causes the blower to blow the component into the hole 260 where it falls into tray 262.

After the components are fed to track 258 adjacent end 273 thereof, a pick-up arm 274, which is pivotal about post 276 and reciprocal vertically about the axis of the post, pivots to the phantom line position shown in FIG. 13 and moves axially downward and picks up a component on vacuum pick-up tip 278 which has vacuum line 280 connected thereto, FIG. 14. The post 276 moves axially upward and the arm 274 swings 90° and positions the pick-up tip 278 as shown in FIG. 14 and in full lines in FIG. 13. The arm and pick-up tip 278 then reciprocate downwardly, the vacuum is cut off line 280 and the chip is deposited in the slide base 69 for insertion into the clamp. A spring 282 normally biases tip 278 downwardly but allows for lost motion if the axial reciprocating movement of post 278 is greater than the distance of the tip above the component in either track end 273 or in the load slide base 69.

LEAD LOAD ASSEMBLIES

Figure 19:
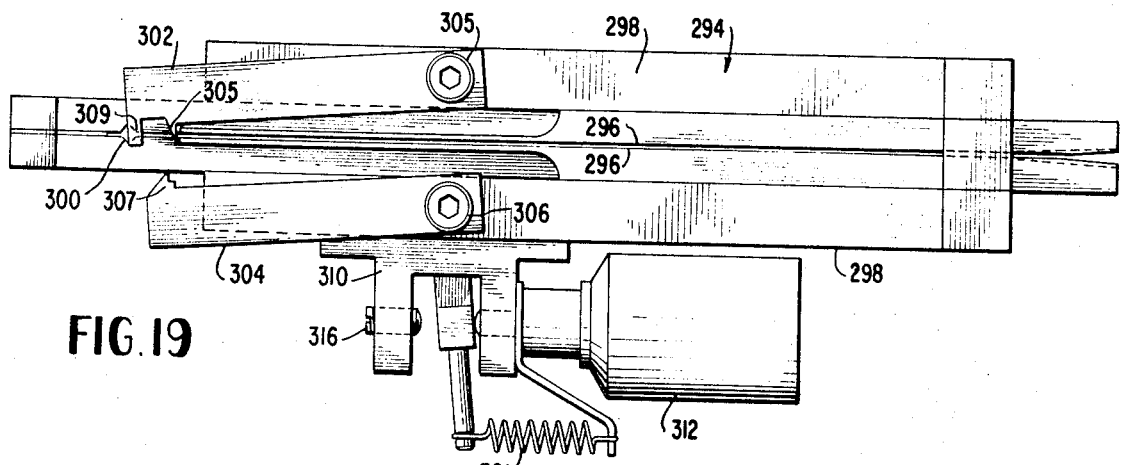
FIG. 19 is an oblique top plan view looking along line 19—19 of FIG. 16.
Figure 20:
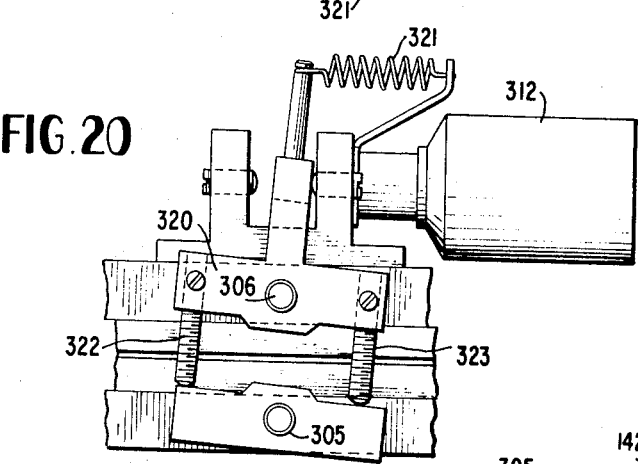
FIG. 20 is an oblique bottom plan view looking along line 20—20 of FIG. 16.
Figure 21:
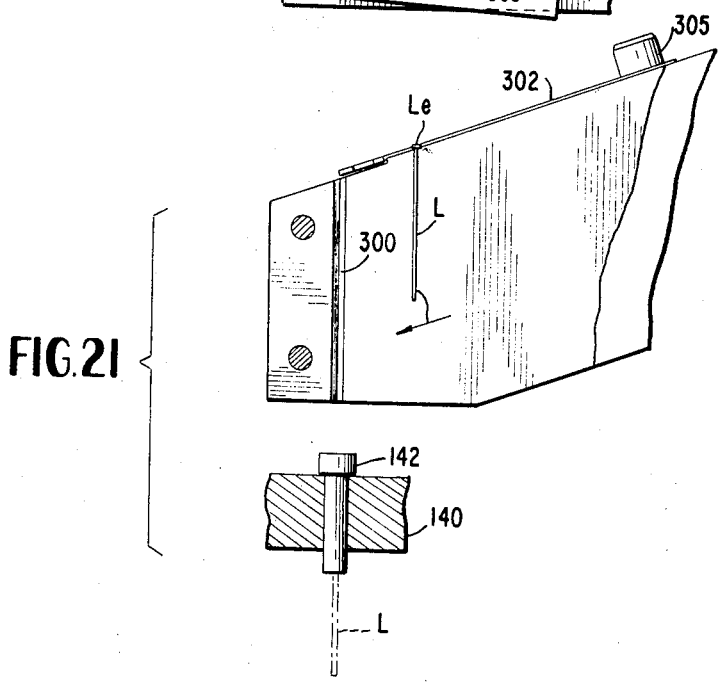
FIG. 21 is a detailed sectional view of the lead dropping mechanism of the invention.

The lead load assemblies 41 and 43 are identical and only one will be described in detail. This is lead load assembly 41 shown in FIGS. 16–22. Referring to FIG. 16, a vibrating bowl assembly 284 of a commercially available type, for example, one obtainable from Automation Devices, Inc. Model #10 has a vibrating bowl 286 with the usual rim which feeds out into a specially constructed feed assembly attachble thereto. This specially constructed feed assembly includes a bowl track unit 288 with a pair of spaced apart rails 290, 290 sandwiching a center rail 292. The center rail is cut away in a special configuration as shown in FIGS. 16, 17 and 18 so that the upset lead end $Le$ rides on the top of the rail 290 while the lead tip dangles along the top of track 292. The rails feed off the bowl track unit 288 into a drop track unit 294 having a pair of rails 296, see FIG. 19. The rails 296 are spaced apart a distance to support the upset lead end $Le$ and are carried by rail supports 298. The spaced apart rails have a drop hole 300 near one end thereof, see FIGS. 19 and 21. Pivotal drop control arms 302 operate together to feed one lead at a time from above the arms down to the drop hole 300 in synchronism with the operation of the lead arm 37. The drop control arms 302 and 304 are pivotable about screw headed pivot shafts 305 and 306. As shown in FIG. 19, the drop arms 302 and 304 have stop fingers 306, 307 and 308 which when operating together allow one lead at a time to pass along the track.

The control of the stop arms is provided by an assembly mounted on a U-shaped bracket 310 and includes a solenoid 312, a spring holder 314 and an adjustable stop 316. An arm 318 is mounted rigidly with the bottom of pivot shaft 305 and a T-shaped arm 320 is mounted rigid with the bottom shaft 306 to pivot therewith. The end of T-shaped arm mounts a spring 321. Adjustable screws 322, 323 held by set screws 324 establish contact between arms 318 and 320. On energization of solenoid 312 the drop control arms 302 and 304 pivot from one side to the other to feed one lead at a time.

Figure 22:
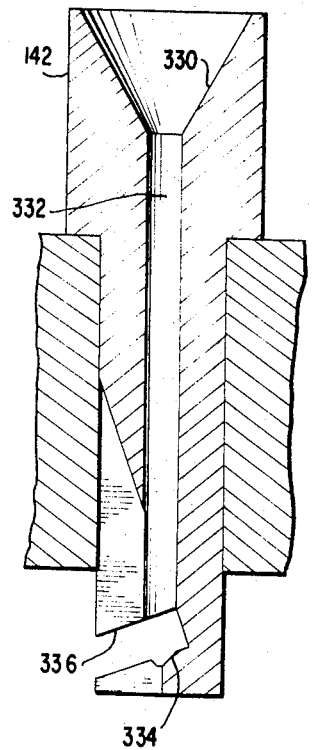
FIG. 22 is an enlarged axial sectional view of the lead dropping funnel shown in FIG. 21.

The drop funnel 142 is shown in detail in FIG. 22 and includes a conical shaped mount 330 opening up into a tubular feeding hole 332 in effect shaped as a funnel. The tip end $Lt$ of each lead $Lt$ is fed into the opening 330 by being dropped from hole 300 and the lead passes down hole 332 until the tip of lead is supported on seat 334 while also being held in the lead arm jaw. When vacuum is applied to the lead arm jaw and the lead arm pivots the lead downwardly the head of the lead passes out through opening 336.

OPERATION

Figure 23:
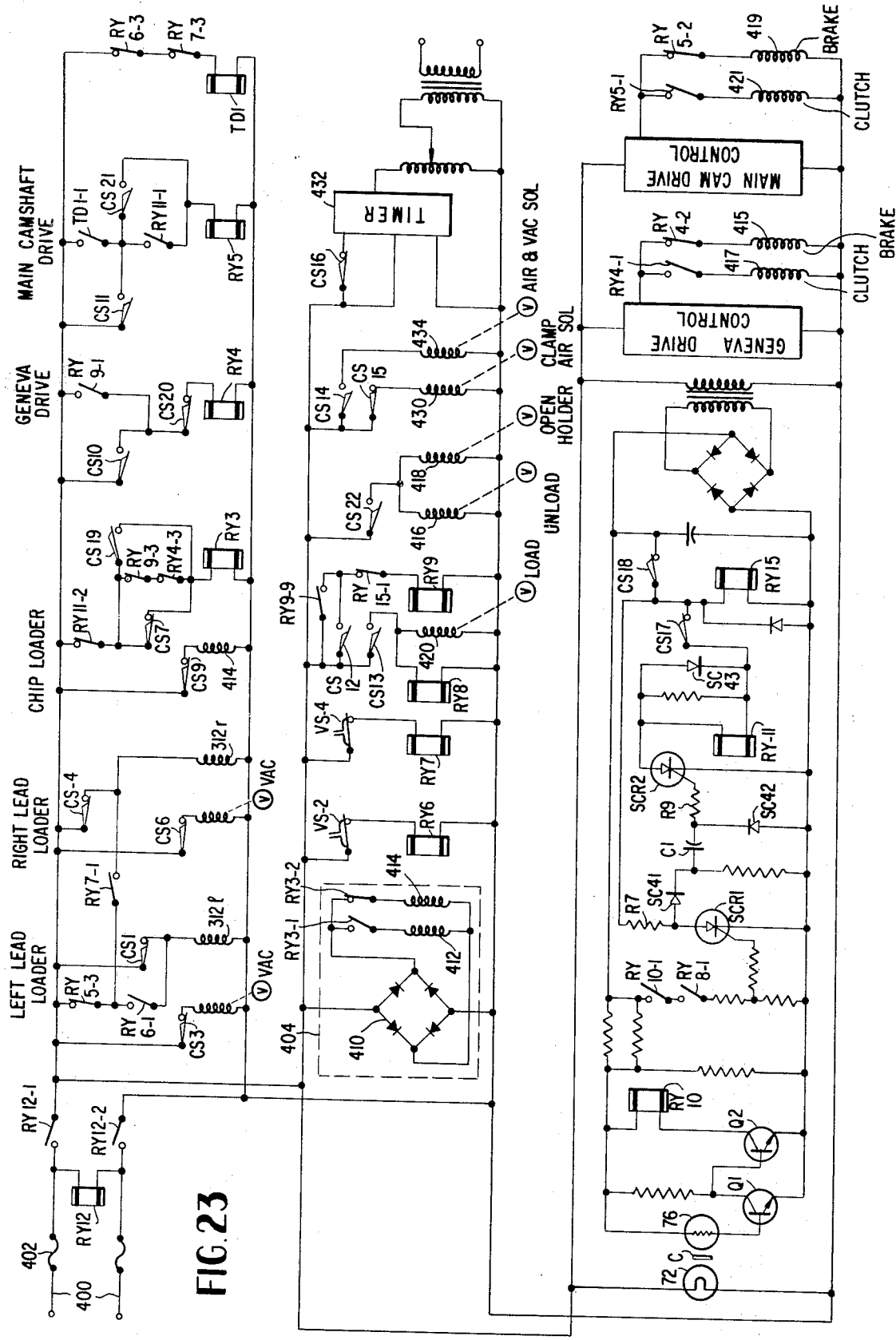
FIG. 23 is an electrical circuit diagram of the electrical controls for the machine of this invention.

The operation of the machine will be described in connection with the electrical circuit diagram which is shown in FIG. 23.

Power is supplied through lines 400 and fuses 402 to energize relay RY12 which closes normally open contacts RY12–1 and 12–2 and applies power to the machine. The right and left lead load feed controls utilize solenoids 312$r$ and 312$l$ respectively. The pick-up arm 274 is operated by cam shaft and cam assembly of the purchased assembly (not shown). There are additional cams on the cam shaft of the chip feeder unit which are used to control individual functions of the feeder and the machine. The cam shaft is connected to a drive motor within the purchased assembly by clutch-braking unit which is controlled by contacts of relay RY3. These contacts apply DC voltage from a bridge 410 to the clutch coil 412 or brake coil 414 depending on whether relay RY3 is energized or deenergized. When relay RY3 is energized the clutch is energized and the brake is released, the cam shaft is connected to the drive motor. When the relay is deenergized, the clutch is deenergized and the brake is energized and the cam shaft is disconnected from the drive motor and held in fixed position.

On the chip loader feed assembly, light 270 and photocell 268 is used in conjunction with a portion of the circuit to assure the chips or components C progressing down the feeder track 258 are in the correct position to be picked up.

As the components C are fed along which feeder track 258 with the glossy side Cs up, due to the components having the non-glossy side up being recycled by the detecting mechanism of FIG. 15, the pick-up arm 274 rotates to the phantom line position of FIG. 13 at a point directly above the end 273 of the feeder track 258. Then, due to cam action the vacuum pick-up arm 274 reciprocates downwardly to pick up a part. The arm is then raised to its original level and moves 90° clockwise as viewed in FIG. 13 to put it correctly above the chip slide base 69. Another cam within the AMI causes the vacuum pick-up arm 274 to be forced down again and a cam CS9 on the AMI cam shaft opens the contacts to vacuum solenoid 414 releasing the chip C. After the part is released and the vacuum arm starts its upward movement CS9 is again restored to the position shown in FIG. 23 applying vacuum to the pick-up tip 278. At the same time during the lifting of the vacuum pick-up arm 274CS 22 is riding onto its lobe closing the switch energizing air solenoids 416 and 418 which operate the unload cylinder 240 and the unclamping cylinder 60 after the unloading and loading stations 36 and 30 respectively.

Next cam CS13 rides onto its lobe closing the circuit to energize the air solenoid 420 for loading cylinder 66 and RY8. Cylinder 66 pushes the chip C into the open jaws of clamp assembly 28 at load station 30. Then CS22 rides off its lobe opening the contacts and allowing the air solenoids to retract the piston rod 62 and the clamp jaw 44 clamps the chip. CS13 then leaves its lobe and the load air solenoid 420 returns to its original position retracting feed slide 68.

After all loading operations for loading the chip C have occurred, CS12 rides into its lobe energizing RY9 which closes contacts RY9–1 pulling in relay RY4. RY4 controls the Geneva drive by energizing brake coil 415 through contacts RY4–2 energizing clutch coil 417 through contacts RY4–1. The Geneva drive will rotate 360° once it is started due to CS10 which is located on a controlled side of the Geneva drive shaft. CS10 is closed when the shaft starts rotating and is opened after the shaft has made one full revolution. RY9 is held energized by its contacts RY9—9 until the Geneva is in rotation and CS18 which is on the Geneva shaft is momentarily opened. This allows RY15 to deenergize and its normally closed contacts RY15–1 will open breaking the circuit to RY9.

With wheel 31 rotating due to the Geneva drive moving, the chip load AMI vacuum pick-up arm 274 will continue its movement back to the feeder track 273 even with RY4 energized and contacts RY4–3 open due to the alternate path through CS7. The arm 274 will pick up another component C and move back over to the component load station 30 and at this time CS7 will ride onto its lobe thus opening the circuit to RY3 which deenergizes the clutch and energizes the brake on the chip load circuit 408. The vacuum pick-up arm 274 will remain in this position and the circuit will remain in this state until a path is completed through either RY11, RY9 and RY4, or if the part is to be soldered through RY11 and CS19. The combination of RY11, RY9 and RY4 will keep the component load assembly 33 and Geneva drive assembly 26 functioning until a part has been sensed and is in the soldering position at lead attach station 34. The normally closed contacts of RY9, insure that only one part will be placed in the loader for each cycle by breaking the circuit to the chip loader when CS12 energizes RY9.

When a chip C in the clamp assembly 28 and at the detection station 32 it obstructs the light path between the lamp 72 and the photocell 76 thus keeping it at an extremely high resistance. With this high resistance no potential is felt on the base of Q1 so it is cut off allowing full collector potential to be felt on the base of Q2. Q2 is biased to saturation, and the current through it is sufficient to energize RY10. It will remain in this state until the Geneva drive assembly 26 rotates wheel 31. While this component C is being sensed, another component is being loaded as described above. When CS13 was closed, RY8 was energized, closing normally opened contacts RY8–1 enabling the detector circuit to be interrogated. With contacts RY8–1 and RY10–1 both closed, a potential is felt on the gate of SCR1 which fires it into saturation. This drops all of the anode voltage across R7, thus reverse biasing SC41 and causing C1 to discharge its potential. The circuit remains in this state until the Geneva drive assembly rotates and transfer switch CS18 located across the Geneva motor shaft of CS10 is momentarily opened. This removes all voltage from the memory circuit to cut off SCR1. As the shaft continues rotation CS18 is closed applying voltage to the circuit. This voltage forward biases SC41 and is felt across C1 and R9 to the gate of SCR2 and saturates it and energizes RY11. With RY11 energized, normally closed contacts RY11–2 open cutting off the chip loader, and normally opened contacts RY11–1 close completing part of the circuit to the main cam drive control relay RY5.

During the interval of time that the machine was placing a chip at the lead attach station 34 the lead loading function is also taking place. A circuit is completed to energize solenoids 312*l* and 312*r* which control the left and right lead feeders respectively. RY5 will be deenergized by CS11 when the lead arm assemblies 37 and 39 are at their vertical position. This will close the circuit through contacts RY5–3 and normally open but now closed contacts RY6–1. VS2, which is a vacuum sensing switch is closed as long as there is no lead in the lead arm and will keep RY6 energized thereby completing a path to solenoid 312*l* through contacts RY6–1. In the same manner, VS4 connected to vacuum line 98 of the right lead arm assembly 37 wlil keep RY7 energized so long as no lead is sensed and a path is completed through normally opened contacts RY7–1 to solenoid 312*r* controlling the right lead loader.

With solenoids 312*l* and 312*r* both energized, one lead passes arms 302 and 304 and drops through hole 300 and funnel 142 into hole 94 of jaw 92 while it is vertical.

When VS2 and VS4 sense leads in their associated jaws, they open due to reduced flow of air into vacuum. This deenergizes RY7 and 8 and completes a circuit through normally closed contacts RY6–3 and RY7–3 to time delay relay TD1. This relay introduces a time delay to insure proper seating of the leads in the jaw by waiting a predetermined time before energizing. When TD1 energizes, it closes normally opened contacts TD1–1 and completes a circuit, when CS21 is closed, to RY5. RY5 controls the main cam drive and when energized deenergizes brake coil 419 through its normally closed contacts RY5–2 energizes clutch coil 412 through its normally opened contacts RY5–1. This causes a main cam to start to rotate. Cams 180 and 182 on the cam shaft 176 cause the lead arm assemblies 37 and 39 to move so that jaws 92 rotated from vertical to horizontal and move inwardly. At this time, CS11 rides off its lobe as the arms come down and the switch CS11 closes. When the arms 37 and 39 are fully down to a horizontal position and just as the jaws 92 start to move toward each other, CS21 rides onto its lobe and opens. At this time, the main cam drive will again stop unless RY11–1 is closed which means that a chip is at the lead attach station 34.

If RY11 is energized, contacts RY11–1 will be closed and the main cam will continue to rotate and the jaws 92 will move the leads L into lead attach position for resistance soldering. As the leads are moving in position, CS15 closes and clamp solenoid 430 is energized. This causes cylinder 80 to force aligning tip 82 against the open side of chip and hold it in aligning notch 48 of clamp assembly 28. As the jaws 92 are moving toward each other, CS19 actuates which energizes the chip loader and starts its cycle. This is a momentary signal to start the vacuum pickup arm 274 and CS7 holds it energized for the full cycle.

As the main cam shaft 176 continues this rotation, the jaws 92 place the leads L into lead attach position. CS16 hits its lobe at this time actuating the soldering timer 432 which applies current for resistance soldering for a predetermined length of time and then shuts off. High current and low voltage is applied to the tips 93 of the jaws to accomplish the resistance soldering of the leads to the silvered ends of the component. The main cam shaft 176 continues rotation while the leads are attached and the jaws 92 begin to retract axially back into the swing arms 105 shortly after the soldering operation is completed. When the jaws 92 are completely retracted CS14 is momentarily actuated by its lobe. This changes the state of the air and vacuum solenoid 434 applying air through line 100 to the jaw 92. This is done to eject defective or unsoldered leads which didn't attach themselves. CS15 also rides off its lobe after the soldering is completed thus deenergizing the clamp air solenoid 430 and allows cylinder 80 to pull back the rod 83. Also at the same time CS17 actuates which clears the chip presence memory allowing it to be set up for the next cycle.

CS20 provides protection to prevent damage, and is open when the lead arm assemblies are moving so the Geneva drive cannot also move concurrently.

The main cam shaft 176 will continue rotation until CS11 again breaks the circuit to RY5 which in turn deenergizes the clutch coil 421 and energizes the brake coil 419 on the main cam drive assembly and sets up the circuit for the lead loading to restart in the cycle.

On the next 90° rotation of wheel 31, the chip C with leads L attached is unloaded at the same time the holder at the load station is open, the unloading being accomplished by energizing unloading air solenoid 416 when CS22 closes.

While the invention has been particularly shown and described with reference to preferred embodiments thereof, it will be understood by those skilled in the art that various changes in form and details may be made therein without departing from the spirit and scope of the invention.

What is claimed is:

1. In a machine for automatically attaching axial leads to electronic components, the machine comprising: a component carrying wheel, spring biased clamps spaced about the periphery of the wheel for holding electronic components, a drive mechanism for rotating the wheel in a step-by-step manner, a pair of lead carrying arms positioned on opposite sides of the plane of the wheel and oscillatable from a vertical lead receiving position to a horizontal lead attach position, the lead attach position being adjacent one portion of the wheel, the lead carrying arms being oscillatable about horizontal axes extending perpendicular to a horizontal axis of the component carrying wheel, a resistance heating connection in the arms for heating the leads to solder the leads to the component at the lead attaching position, an arm moving mechanism for oscillatably driving the lead carrying arms from the vertical lead receiving position to the horizontal lead attach position, automatic mechanical means at a load station adjacent another portion of the periphery of the component carrying wheel for loading electronic components into the clamps on the wheel, automatic mechanical means at an unloading station adjacent a further portion of the component carrying wheel for unloading the components with the leads soldered thereto, automatic mechanical means for loading leads into the lead carrying arms while in the vertical lead receiving position, and means automatically controlling the automatic mechanical loading means, automatic mechanical unloading means and automatic mechanical lead loading means with the drive of the component carrying wheel and the arm moving mechanism.

2. A machine as in claim 1 wherein the lead carrying arms include rigid jaws at the tips thereof with holes in the jaws for holding the leads, the jaws including a fluid connection from a vacuum source to the holes in the tips of the jaws for holding the leads by vacuum, and vacuum sensing means for sensing the presence of the leads for controlling the machine.

3. A machine as in claim 2 further comprising means for applying air under pressure at a time after a lead attaching operation to clear the jaws of any defective leads that did not attach, the air being applied to the holes in the jaw tips holding the leads.

4. In a machine as in claim 1 wherein the jaws are movable axially of the lead carrying arms and further comprising drive means for axially moving the jaws from a retracted lead receiving position with the arms vertical to an extended lead applying position when the arms are horizontal.

5. A machine as in claim 4 wherein the means for moving the jaws includes a cam driven mechanism operated in synchronism with the arm moving mechanism for oscillatably moving the lead carrying arms and further comprising a vertically positioned funnel above the vertical position of each lead carrying arm constituting a portion of the automatic mechanical means for loading leads into the lead carrying arms.

6. A machine as in claim 1 wherein there is one clamp at four equally spaced positions on the periphery of the wheel and further comprising means for opening the clamps adjacent the periphery of the wheel at two positions, one constituting the portion of the automatic means for loading components into the clamps and the other constituting the means for unloading the components by gravity fall from the clamps.

7. In a machine as in claim 1 including a light and a photo-responsive detector positioned on opposite sides of the plane of the wheel at a position prior to the lead attach position in the direction of movement of the wheel, and control means connected to the light and photoresponsive detector for controlling operation of the machine depending on whether or not a component is detected by the photo-responsive detector.

8. A machine as in claim 6 wherein the means for opening the clamps include power cylinders having extensible piston rods which contact a biased pivotally mounted arm of the clamp.

9. A machine as in claim 1 wherein a positioning and clamping cylinder is mounted at the lead attach station opposite the wheel and is actuatable to position the component against the portion of the clamp for alignment thereof.

10. A machine as in claim 1 wherein the automatic means for loading components onto the wheel include a component mechanism for feeding the components one at a time and a detection-rejection means for detecting a desired side of the components and rejecting those components presenting an undesired side prior to feeding the components one at a time.

11. A machine as in claim 10 wherein the means for feeding the components one at a time include an oscillating pick-up arm with vacuum applied thereto and a power cylinder actuated slide, both the pick-up arm and slide being interconnected with the operation of the step-by-step drive for the wheel.

12. A machine as in claim 1 further including electrical switch means for applying current to the resistance heater and control for the switch, the switch control allowing current to be applied to the resistance heater only after the components and leads are in the lead attaching position.

References Cited

UNITED STATES PATENTS

| | | | |
|---|---|---|---|
| 1,946,980 | 2/1934 | Loomis | 250—223 X |
| 2,591,065 | 4/1952 | Habel | 219—85 |
| 2,606,268 | 8/1952 | Pityo et al. | 219—103 X |
| 2,887,849 | 5/1959 | Lytle | 214—1 X |
| 3,083,291 | 3/1963 | Soffa et al. | |
| 3,215,810 | 11/1965 | Lange et al. | 219—79 |
| 3,294,950 | 12/1966 | Hagner et al. | 219—103 |
| 3,317,702 | 5/1967 | Mann | 219—103 |

JOSEPH V. TRUHE, Primary Examiner

L. A. SCHUTZMAN, Assistant Examiner

U.S. Cl. X.R.

29—203; 219—79, 159